Oct. 30, 1951 W. C. KINNEY 2,573,203
PIPE COUPLING
Filed Sept. 23, 1947
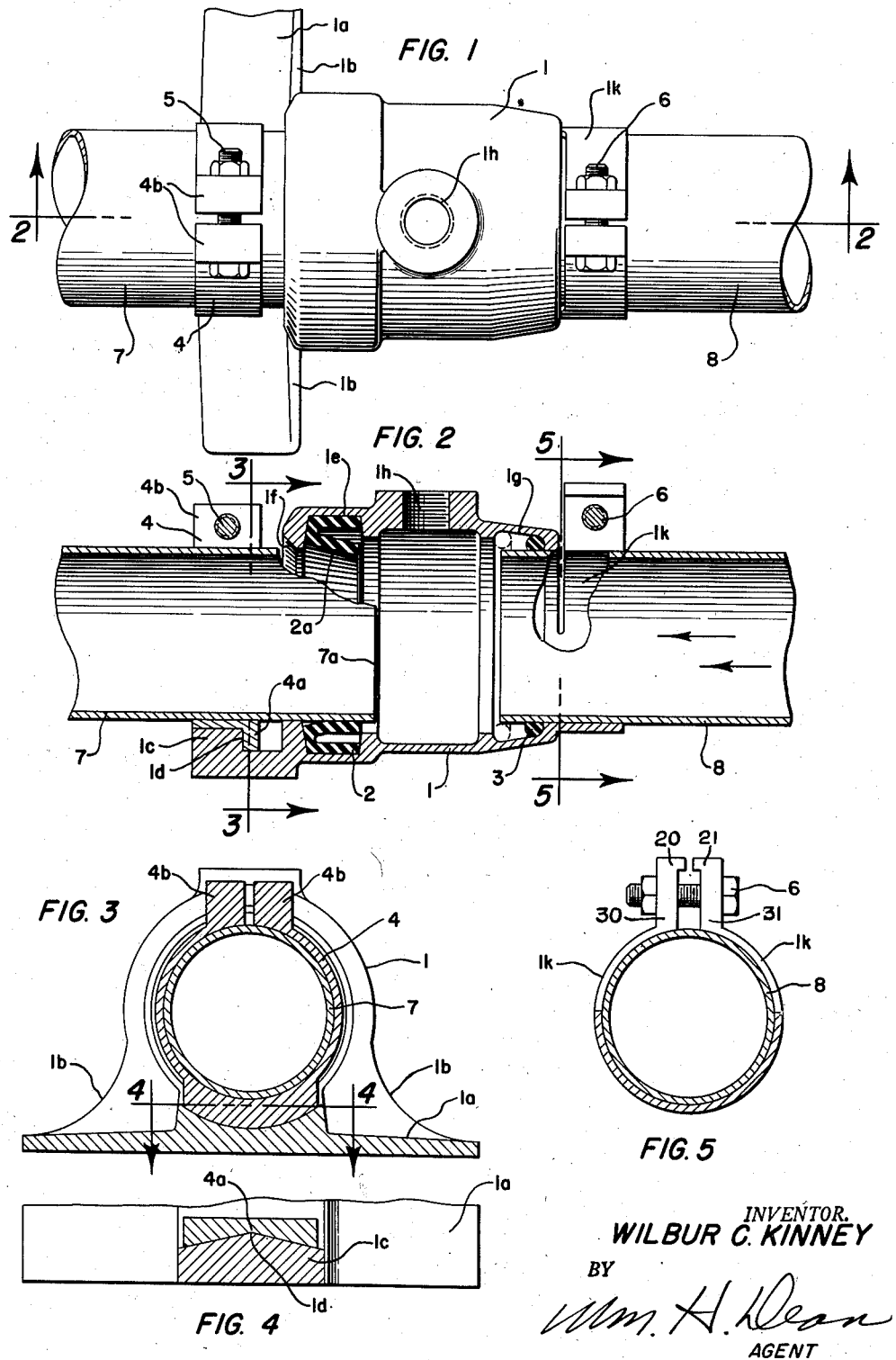
INVENTOR.
WILBUR C. KINNEY
BY
Wm. H. Dean
AGENT Patented Oct. 30, 1951

2,573,203

UNITED STATES PATENT OFFICE 2,573,203

PIPE COUPLING

Wilbur C. Kinney, Vista, Calif.

Application September 23, 1947, Serial No. 775,653

13 Claims. (Cl. 285—143)

My invention relates to a pipe coupling, more particularly for use in irrigation, and the objects of my invention are:

First, to provide a pipe coupling of this class which greatly facilitates the conduction of water to various places from a certain source of supply;

Second, to provide a pipe coupling of this class which saves considerable time in the routing of water from one place to another;

Third, to provide a pipe coupling of this class which promotes the use of water-proof conduits for irrigation purposes whereby considerable water is saved by preventing the same from being absorbed in the dry soil;

Fourth, to provide a pipe coupling of this class which may be employed in connecting sections of pipe together whereby the operator thereof may handle long lengths of pipe and conveniently couple the same together without help;

Fifth, to provide a pipe coupling of this class which promotes the use of thin walled light weight tubing for conducting water which does not require screw threads or other similar fittings;

Sixth, to provide a coupling of this class which is readily made water tight by internal pressure of the water within the coupling;

Seventh, to provide a coupling of this class having an internally converging annular gasket seat arranged to accommodate a conventional O-ring whereby slight reciprocal movement of the tube within the coupling forces the O-ring by means of frictional engagement into the converging portion of the coupling around the tube positively sealing the connection of the tube with the coupling;

Eighth, to provide a coupling of this class which employs a locking lug on the base thereof open at its upper side whereby the end of a pipe being inserted in the coupling may be rested on the locking lug preliminary to the insertion of a complementary locking lug clamped on the tube, thus greatly facilitating the guidance of the end of the tube into the coupling when connecting the same; and Ninth, to provide a coupling of this class which is very simple and economical of construction, efficient in operation and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawing and to the characters of reference thereon forming a part of this application in which:

Figure 1 is a top or plan view of my coupling; Fig. 2 is a longitudinal sectional view thereof taken from the line 2—2 of Fig. 1; Fig. 3 is a transverse sectional view taken from the line 3—3 of Fig. 2; Fig. 4 is a plan sectional view taken from the line 4—4 of Fig. 3 and Fig. 5 is a transverse sectional view taken from the line 5—5 of Fig. 2.

Similar characters of reference refer to similar parts and portions throughout the several views of the drawing.

The coupling casing 1, gasket 2, O-ring 3, coupling ring 4, bolts 5 and 6 and pipes 7 and 8 constitute the principal parts of my pipe coupling.

The coupling casing 1 is substantially a hollow tubular member having a laterally extending base 1a at its lower side provided with reinforcing ribs 1b at opposite sides thereof. The upper side of the base 1a is provided with a locking lug 1c which is angular in form having an apex portion 1d extending rearwardly with which the conforming lug 4a of the coupling ring 4 engages. This coupling ring 4 is a split ring having enlarged end portions 4b through which the bolt 5 passes for clamping this coupling ring 4 on the exterior of the pipe 7 in spaced relationship with the end 7a thereof. The coupling casing 1 is provided with an internal enlarged bore portion 1e in which the gasket 2 is positioned. This gasket 2 is substantially U-shaped in cross section as shown in Fig. 2 of the drawing, and the open edge thereof is placed toward the oncoming flow of water as indicated by arrows in Fig. 2. The internal bore 2a of this gasket 2 is tapered and converging inwardly of the casing 1 so that the end 7a of the pipe 7 may be readily inserted in the gasket 2 and intimately engaged thereby due to the resilient character of the gasket 2 which is preferably made of rubber or other suitable material. It will be here noted that the entrance of the casing 1 to the gasket 2 is provided with an inwardly converging frontal portion 1f which facilitates the placement of the end 7a of the pipe 7 in the gasket 2, all as shown best in Fig. 2 of the drawing. The middle body portion of the coupling casing 1 is provided with an outlet opening 1h therein arranged to accommodate fittings designed to conduct water to sprinkler systems or the like. Near the rear end of the coupling casing 1 I have provided an internally converging bore portion 1g in which the O-ring 2 is positioned and arranged to move during reciprocal movement of the pipe 8 whereby insertion of the pipe 8 and retraction thereof forces the O-ring 3 into the converging end of the bore portion 1g squeezing the same in close fitting surrounding relationship with the exterior of the tube 8 efficiently sealing the same with respect to the interior of the casing 1. The end of the coupling casing 1 adjacent the O-ring 3 is provided with a clamp portion 1k having a bolt 6 extending through opposite ends thereof arranged to securely tighten the tube 8 in longitudinally fixed relationship in the end of said coupling casing 1. It is observed that the clamp portions 1k each extend upwardly and are apertured for the passage of the bolt 6, and with the upper ends of such clamp portions 1k having a pair of inwardly extending stops 20, 21 to limit relative movement of the clamp portions 1k when and as the bolt 6 is being tightened. In other words, when the bolt 6 is tightened the stop members 20 and 21 abut, thereby preventing further relative movement between the extremities of such clamp portions 1k; however, further tightening of bolt 6 results in inward movement of the clamp portions 30, 31 which are adjacent the pipe 8. Thus, each of the tubes 7 and 8 is provided with one of the coupling casings 1 fixed to one end thereof by means of one of the bolts 6 while the opposite end thereof is insertable into the adjacent coupling casing adjacent to which is provided with a coupling ring 4. It will be noted that the base 1a of the coupling casing 1 provides a rest for the tube 7 when being inserted into the gasket 2 and when the coupling ring 4 is engaged with the locking lug 1c of the base 1a.

The operation of my pipe coupling is substantially as follows:

When it is desired to conduct water from a certain source of supply to a certain destination, the tubes 7 and 8 which are substantially identical are each fitted on one end with a coupling casing 1 and on their opposite end with a coupling ring 4 so that each successive section of tubing is laid upon the ground and the base portion 1a in connection with each of the coupling casings 1 provides a support therefor. The opposite end of each tube is placed in a gasket 2 in each of the coupling casings 1 so that a continuous conductor is very easily and quickly extended a considerable distance. When placing the end 7a of the tube 7 in the gasket 2 in the coupling casing 1, the end 7a is first placed on the lug 1c and forced into the gasket 2. Then the corresponding lug portion 4a on the coupling ring 4 is turned substantially less than 90° interlocking with the lug 1c prevent longitudinal displacement of the tube 7 relatively to the coupling casing 1. The gasket 2 is expanded in both directions by water pressure and the converging bore portion 2a of the gasket 2 provides for the reception of the end 7a of the tube 7 when inserted therein, and the end 7a of the tube 7 is initially guided into the gasket 2 by means of the funnel shaped portion 1f at the end of the coupling casing 1.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a pipe coupling of the class described the combination of a hollow cylindrical coupling member having a base portion on one end adapted to bear on the ground, a tube adapted to be inserted into the open end of said coupling, a coupling ring on said tube having a lug thereon, and said base of said coupling having a recessed lug therein adapted to be engaged by the lug on said coupling ring for holding the said pipe longitudinally placed in said coupling.

2. In a pipe coupling of the class described, the combination of a hollow cylindrical coupling member having a base portion on one end adapted to bear on the ground, a tube adapted to be inserted into the open end of said coupling, a coupling ring on said tube having a lug thereon, said base of said coupling having a recessed lug therein adapted to be engaged by the lug on said coupling ring for holding the said pipe longitudinally placed in said coupling, and a gasket in said coupling adapted to engage the outer side of said pipe.

3. In a pipe coupling of the class described, the combination of a hollow cylindrical coupling member having a base portion on one end adapted to bear on the ground, a tube adapted to be inserted into the open end of said coupling, a coupling ring on said tube having a lug thereon, said base of said coupling having a recessed lug therein adapted to be engaged by the lug on said coupling ring for holding the said pipe longitudinally placed in said coupling, and a gasket in said coupling adapted to engage the outer side of said pipe, said gasket being annular and substantially V-shaped in cross section.

4. In a pipe coupling of the class described, the combination of a hollow cylindrical coupling member having a base portion on one end adapted to bear on the ground, a tube adapted to be inserted into the open end of said coupling, a coupling ring on said tube having a lug thereon, said base of said coupling having a recessed lug therein adapted to be engaged by the lug on said coupling ring for holding the said pipe longitudinally placed in said coupling, a gasket in said coupling adapted to engage the outer side of said pipe, said gasket being annular and substantially V-shaped in cross section, the opposite end of said coupling having a converging bore therein, and a gasket in said converging bore, a tube inwardly of said gasket engaged by the same.

5. In a pipe coupling of the class described, the combination of a hollow cylindrical coupling member having a base portion on one end adapted to bear on the ground, a tube adapted to be inserted into the open end of said coupling, a coupling ring on said tube having a lug thereon, said base of said coupling having a recessed lug therein adapted to be engaged by the lug on said coupling ring for holding the said pipe longitudinally placed in said coupling, a gasket in said coupling adapted to engage the outer side of said pipe, said gasket being annular and substantially V-shaped in cross section, the opposite end of said coupling having a converging bore therein, a gasket in said converging bore, a tube inwardly of said gasket engaged by the same, said coupling provided with a clamp portion adjacent said last mentioned gasket for maintaining said second mentioned tube in fixed relationship with said coupling.

6. In a pipe coupling of the class described the combination of a hollow cylindrical coupling member having a base portion on one end adapted to bear on the ground, a tube adapted to be inserted into the open end of said coupling, a coupling ring on said tube having a lug thereon, said base of said coupling having a recessed lug therein adapted to be engaged by the lug on said coupling ring for holding the said pipe longitudinally placed in said coupling, said coupling ring having a clamp portion thereon adapted to be fixed on said pipe in spaced relationship from the end thereof.

7. In a pipe coupling of the class described, the combination of a hollow cylindrical coupling member having a base portion on one end adapted to bear on the ground, an annular gasket within said coupling member, a tube adapted to be inserted into the open end of said coupling and through said annular gasket, a lug on said tube, and said base of said coupling having a recessed lug therein adapted to be engaged by the lug on said tube for holding the said tube longitudinally placed in said coupling.

8. In a pipe coupling of the class described, the combination of a hollow cylindrical coupling member having a base portion on one end adapted to bear on the ground, an annular gasket within said coupling member a tube adapted to be inserted into the open end of said coupling and through said annular gasket, a lug on said tube, said base of said coupling having a recessed lug therein adapted to be engaged by the tube lug for holding the said tube longitudinally placed in said coupling, and said recessed lug being annular in form to provide an alignment rest for the end of said tube to facilitate the insertion of said tube into said coupling member and to provide a rest for the tube after it is inserted in said coupling member.

9. In a pipe coupling of the class described, the combination of a hollow cylindrical coupling member having a base portion on one end adapted to bear on the ground, an annular gasket within said coupling member a tube adapted to be inserted into the open end of said coupling and through said annular gasket, said tube having a lug thereon, said base of said coupling having a recessed lug therein adapted to be engaged by the lug on said tube for holding said tube longitudinally placed in said coupling, said tube lug and said base lug having cooperating engaging faces, one of which is reentrant to provide self-positioning of said tube in said coupling member.

10. In a pipe coupling of the class described, the combination of a hollow cylindrical coupling member having a base portion on one end adapted to bear on the ground an annular gasket within said coupling member, a tube adapted to be inserted into the open end of said coupling through said annular gasket, a lug on said tube, said base of said coupling having a recessed lug therein adapted to be engaged by the tube lug for holding the said pipe longitudinally placed in said coupling, said base lug being angular in form to provide a rest for the end of said tube to facilitate the insertion of said tube into said coupling member and to provide a rest for said tube after it is inserted in said coupling member, and said tube lug and said base lug having cooperating engaging faces, one of which is reentrant, to provide self-positioning of said tube in predetermined relationship within said coupling member.

11. In a pipe coupling of the class described, the combination of a hollow cylindrical coupling member having a base portion on one end adapted to bear on the ground, an annular gasket within said coupling member, a tube adapted to be inserted into the open end of said coupling through said gasket, a lug on said coupling, and said base of said coupling having a recessed lug thereon adapted to be engaged by the lug on said tube for holding said tube longitudinally placed in said coupling, the recess in said recessed lug being substantially wider than the width of said lug on said tube to allow said tube to be cocked at different angles with respect to the longitudinal axis of the coupling.

12. In a pipe coupling of the class described, the combination of a hollow cylindrical coupling member having a base portion on one end adapted to bear on the ground, an annular gasket within said coupling member a tube adapted to be inserted into the open end of said coupling through said annular gasket, said tube having a lug thereon, said base of said coupling having a recessed lug therein adapted to be engaged by the lug on said tube for holding said tube longitudinally placed in said coupling, and means between said base and said coupling member to provide self-positioning of said tube in said coupling member.

13. In a pipe coupling of the class described, the combination of a hollow cylindrical coupling member having a base portion on one end adapted to bear on the ground an annular gasket within said coupling member, a tube adapted to be inserted into the open end of said coupling through said annular gasket, said tube having a lug thereon, said base of said coupling having a recessed lug therein adapted to be engaged by the lug on said tube for holding said tube longitudinally placed in said coupling, means between said base and said coupling member to provide self-positioning of said tube in said coupling member, the recess within said recessed lug having a width substantially greater than the width of the tube lug to allow the tube to be cocked at different angles with respect to the longitudinal center of the coupling member.

WILBUR C. KINNEY.

REFERENCES CITED

The following references are of record in the file of this patent:

UNITED STATES PATENTS

| Number | Name | Date |
| --- | --- | --- |
| 1,450,108 | Munslow | Mar. 27, 1923 |
| 2,132,769 | Wallis | Oct. 11, 1938 |
| 2,272,890 | Bosomworth | Feb. 10, 1942 |
| 2,477,592 | Gage | Aug. 2, 1949 |

FOREIGN PATENTS

| Number | Country | Date |
| --- | --- | --- |
| 13,113 | Great Britain | June 6, 1907 |